(12) United States Patent
Williams

(10) Patent No.: US 10,577,181 B1
(45) Date of Patent: Mar. 3, 2020

(54) ADJUSTABLE DIAMETER PIPE GRABBER

(71) Applicant: Shannon Williams, Colorado Springs, CO (US)

(72) Inventor: Shannon Williams, Colorado Springs, CO (US)

( * ) Notice: Subject to any disclaimer, the term of this patent is extended or adjusted under 35 U.S.C. 154(b) by 0 days.

(21) Appl. No.: 16/417,701

(22) Filed: May 21, 2019

Related U.S. Application Data

(63) Continuation-in-part of application No. 15/802,686, filed on Nov. 3, 2017, now abandoned.

(51) Int. Cl.
   B65G 7/12 (2006.01)

(52) U.S. Cl.
   CPC ........ B65G 7/12 (2013.01); *B65G 2201/0276* (2013.01)

(58) Field of Classification Search
   CPC .. B25B 13/5083; B25B 13/54; B25J 15/0047; B65G 7/12; B65G 2201/0276; B66C 1/54; B66C 1/56
   USPC ......... 294/93–96, 86.24, 86.25; 81/444–446, 81/177.6
   See application file for complete search history.

(56) References Cited

U.S. PATENT DOCUMENTS

| | | | | |
|---|---|---|---|---|
| 1,958,330 | A * | 5/1934 | Beard | B25D 1/16 279/106 |
| 2,610,888 | A * | 9/1952 | Pace | B66C 1/56 294/93 |
| 2,811,067 | A * | 10/1957 | Greer | B25B 13/5083 81/445 |
| 3,731,364 | A * | 5/1973 | Romero | B25B 13/54 29/240 |
| 4,273,372 | A * | 6/1981 | Sheshtawy | E21B 17/06 166/212 |
| 4,377,956 | A * | 3/1983 | Cooper | B25B 27/18 294/95 |
| 5,647,627 | A | 7/1997 | Baessler | |
| 5,988,719 | A | 11/1999 | Lavender | |
| 6,010,171 | A * | 1/2000 | Margiottiello | B66C 1/54 294/86.25 |
| 6,898,998 | B2 * | 5/2005 | Shyu | B25B 13/461 81/124.7 |
| 7,232,167 | B2 | 6/2007 | Edwards | |
| 7,448,303 | B2 * | 11/2008 | Sweat | B25B 13/5083 294/96 |

* cited by examiner

*Primary Examiner* — Dean J Kramer
(74) *Attorney, Agent, or Firm* — Kyle A. Fletcher, Esq.

(57) ABSTRACT

The adjustable diameter pipe grabber is configured for use with a pipe. The adjustable diameter pipe grabber is a mechanical device. The adjustable diameter pipe grabber captures the pipe for transport. The adjustable diameter pipe grabber engages the pipe from the interior surface of the pipe. The adjustable diameter pipe grabber comprises a tube and a capture structure. The tube contains the capture structure. The tube inserts into the pipe. The capture structure is a spring-loaded device. The capture structure applies pressure to the interior surface of the pipe such that the friction between the capture structure and the interior surface of the pipe allows the adjustable diameter pipe grabber to capture and move the pipe.

16 Claims, 5 Drawing Sheets

ADJUSTABLE DIAMETER PIPE GRABBER

CROSS REFERENCES TO RELATED APPLICATIONS

This non-provisional application is a continuation-in-part application filed under 37 CFR 1.53(b) that claims the benefit of United States 35 USC 120 from non-provisional application U.S. Ser. No. 15/802,686 filed on Nov. 3, 2017, by the inventor: Shannon Williams of Colorado Springs, Colo. This non-provisional application incorporates non-provisional application U.S. Ser. No. 15/802,686 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations including hoisting and lifting using cranes, capstans, winches and tackle, more specifically, a load engaging element with a gripping member engaging only the interior surfaces of an object. (B66C1/42)

SUMMARY OF INVENTION

The adjustable diameter pipe grabber is configured for use with a pipe. The adjustable diameter pipe grabber is a mechanical device. The adjustable diameter pipe grabber captures the pipe for transport. The adjustable diameter pipe grabber engages the pipe from the interior surface of the pipe. The adjustable diameter pipe grabber comprises a tube and a capture structure. The tube contains the capture structure. The tube inserts into the pipe. The capture structure is a spring-loaded device. The capture structure applies pressure to the interior surface of the pipe such that the friction between the capture structure and the interior surface of the pipe allows the adjustable diameter pipe grabber to capture and move the pipe.

These together with additional objects, features and advantages of the adjustable diameter pipe grabber will be readily apparent to those of ordinary skill in the art upon reading the following detailed description of the presently preferred, but nonetheless illustrative, embodiments when taken in conjunction with the accompanying drawings.

In this respect, before explaining the current embodiments of the adjustable diameter pipe grabber in detail, it is to be understood that the adjustable diameter pipe grabber is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the adjustable diameter pipe grabber.

It is therefore important that the claims be regarded as including such equivalent construction insofar as they do not depart from the spirit and scope of the adjustable diameter pipe grabber. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
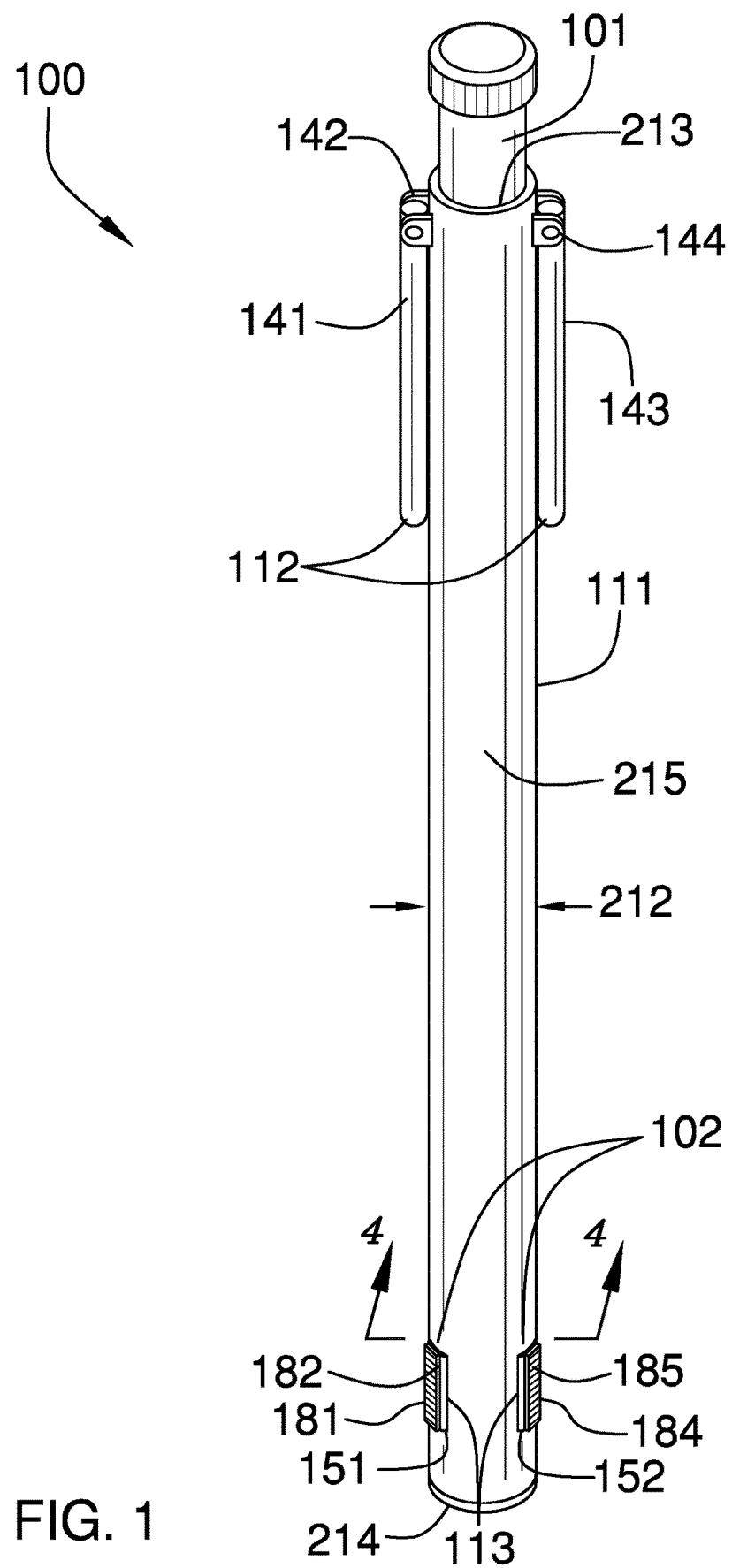
FIG. 1 is a perspective view of an embodiment of the disclosure.
Figure 2:
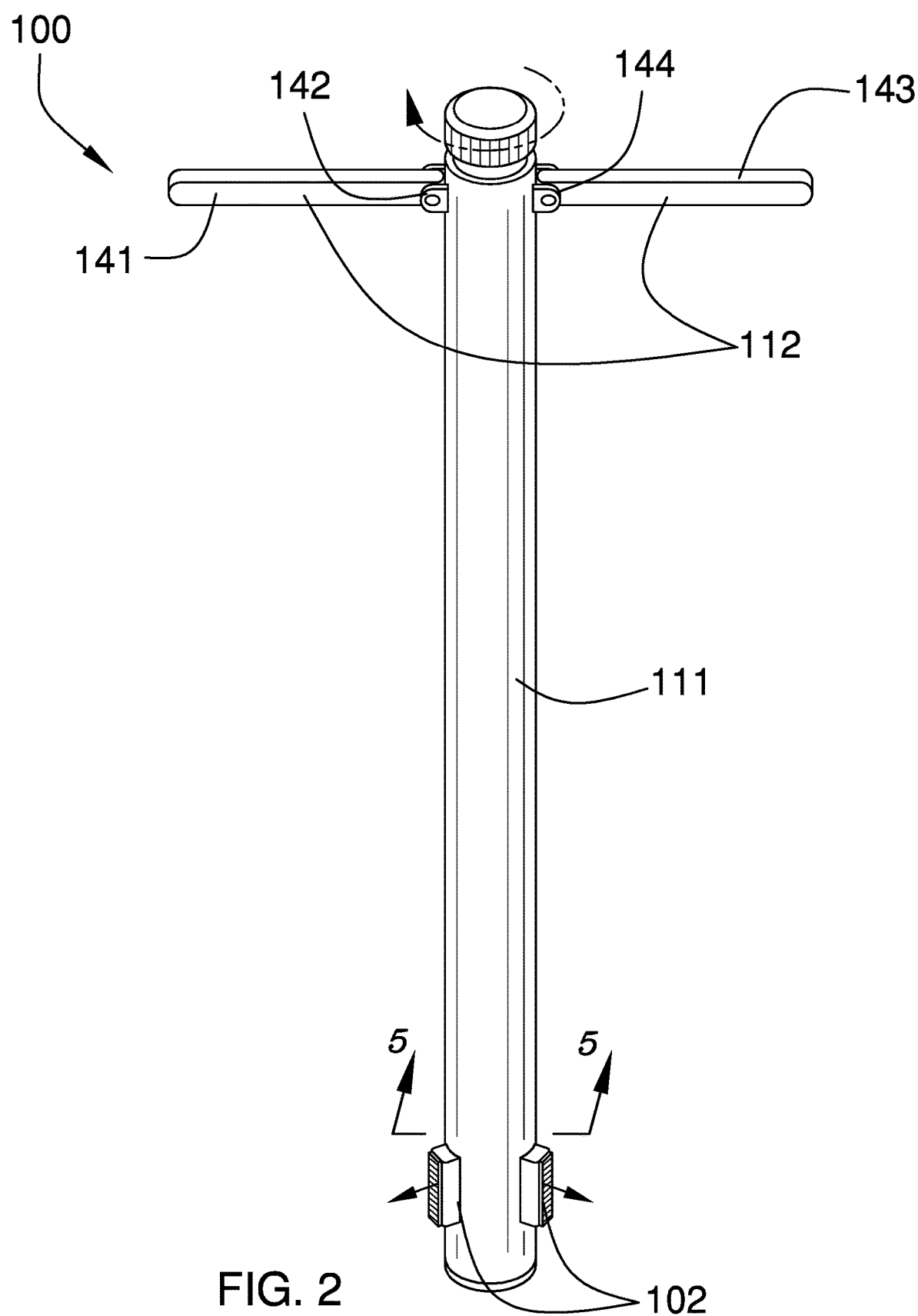
FIG. 2 is a perspective view of an embodiment of the disclosure.
Figure 3:
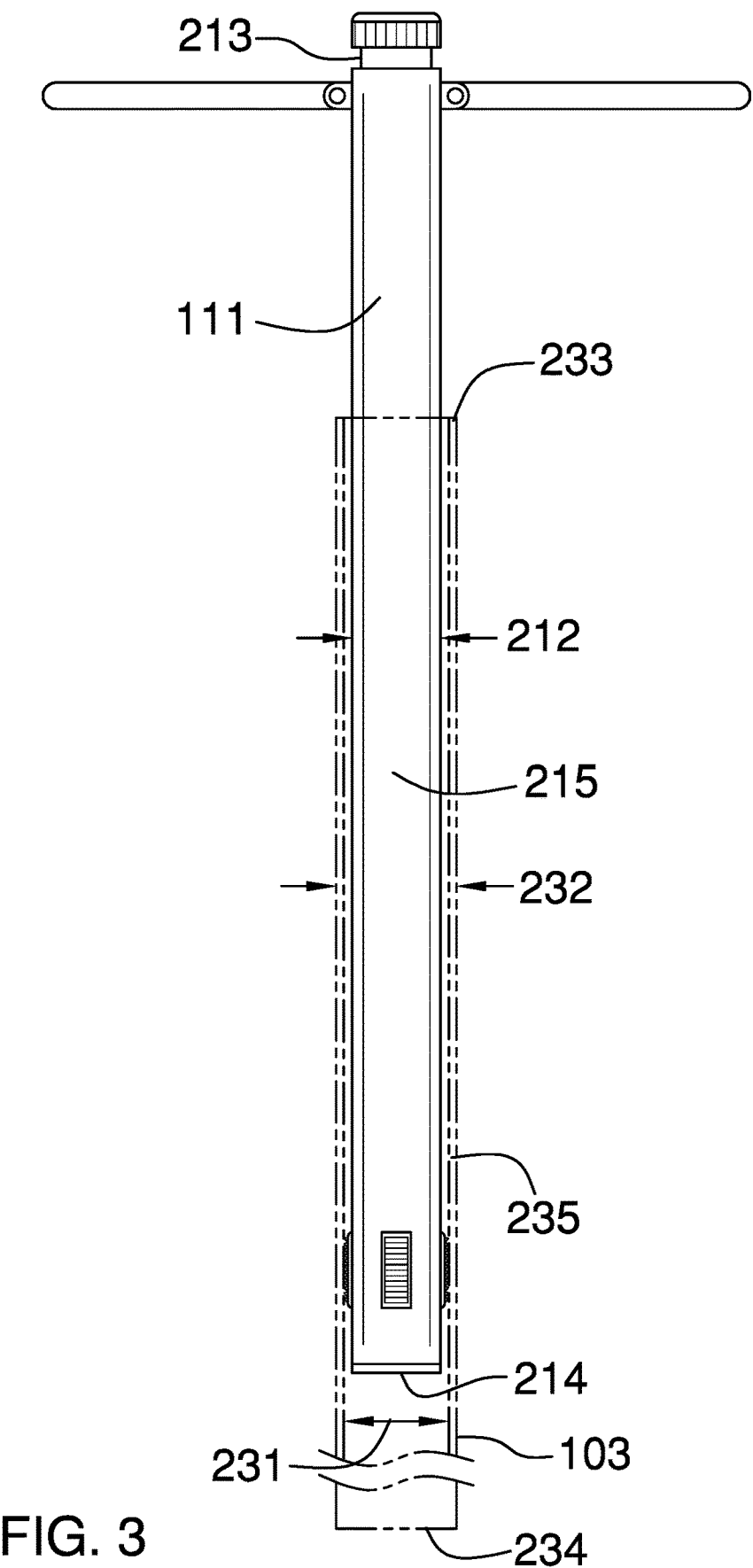
FIG. 3 is an in-use view of an embodiment of the disclosure.
Figure 4:
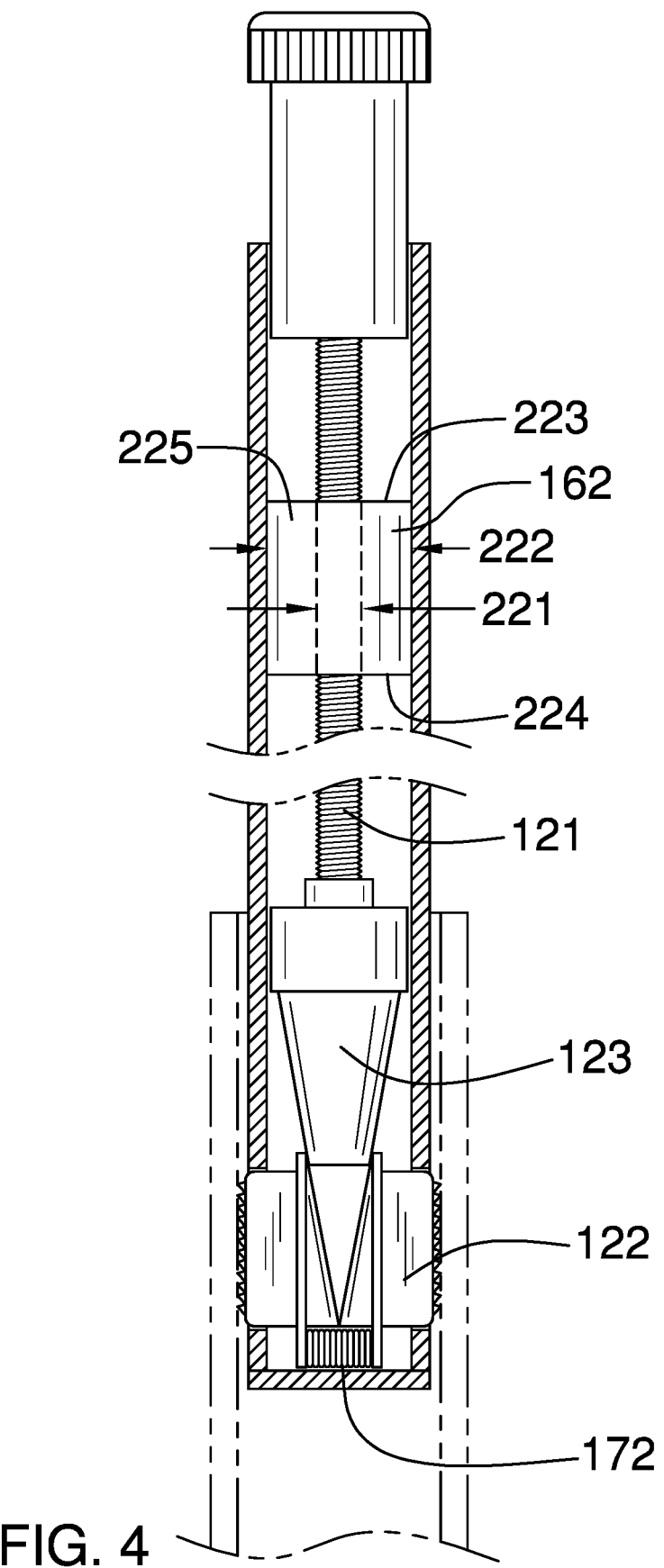
FIG. 4 is a cross-sectional view of an embodiment of the disclosure.
Figure 5:
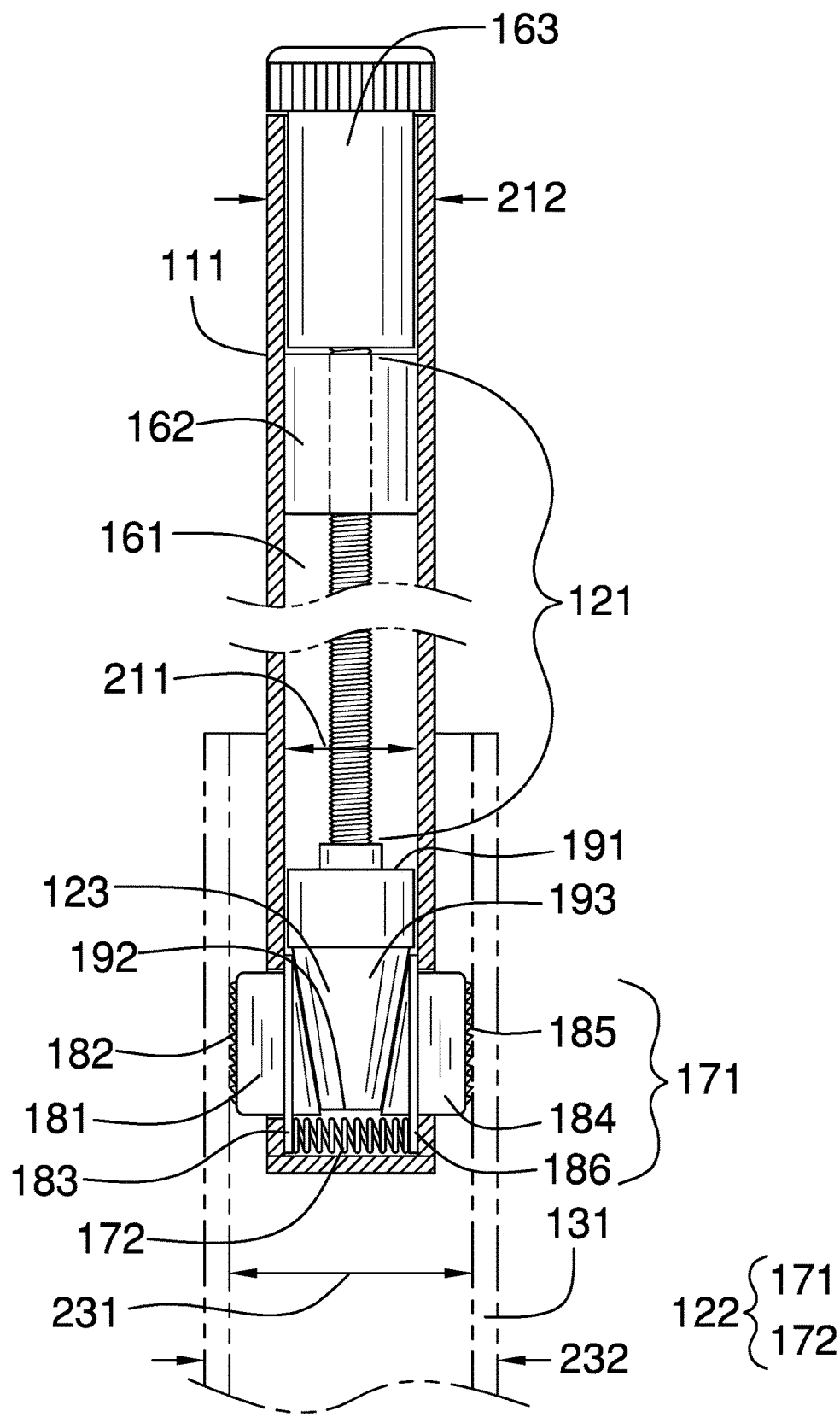
FIG. 5 is a cross-sectional view of an embodiment of the disclosure.

Detailed reference will now be made to one or more potential embodiments of the disclosure, which are illustrated in FIGS. 1 through 5.

The adjustable diameter pipe grabber 100 (hereinafter invention) is configured for use with a target pipe 103. The invention 100 is a mechanical device. The invention 100 captures the target pipe 103 for transport. The invention 100 engages the target pipe 103 from the interior surface of the target pipe 103. The invention 100 comprises a master tube 101 and a capture structure 102. The master tube 101 contains the capture structure 102. The master tube 101 inserts into the target pipe 103. The capture structure 102 is a spring-loaded device. The capture structure 102 applies pressure to the interior surface of the target pipe 103 such that the friction between the capture structure 102 and the interior surface of the target pipe 103 allows the invention 100 to capture and move the target pipe 103.

In this disclosure, the terms inner dimension, outer dimension, congruent end, and lateral face are defined at the end of the specification of this application. The pipe terms and tube are defined at the end of the specification of this application.

The target pipe 103 is a prism-shaped tube. The target pipe 103 is a pipe that is targeted for capture by the invention 100. The target pipe 103 comprises a third prism structure 131. The third prism structure 131 is a hollow tubular structure. The third prism structure 131 forms the primary shape of the target pipe 103. This disclosure assumes that the third prism structure 131 of the third superior congruent end 233 of the target pipe 103 is open such that the first prism structure 111 of the master tube 101 will insert into the third prism structure 131. The third prism structure 131 is further defined with a third inner dimension 231, a third outer dimension 232, a third superior congruent end 233, a third inferior congruent end 234, and a third lateral face 235.

The master tube 101 is a prism-shaped tube. The master tube 101 is geometrically similar to the target pipe 103. The congruent ends of the prism shape of the master tube 101 are open. The master tube 101 contains the capture structure 102. The master tube 101 comprises a first prism structure 111, a handle 112, and a plurality of pad apertures 113. The first prism structure 111 is further defined with a first inner dimension 211, a first outer dimension 212, a first superior congruent end 213, a first inferior congruent end 214, and a first lateral face 215.

The first outer dimension 212 of the first prism structure 111 of the master tube 101 is lesser than the span of the length of the third inner dimension 231 of the third prism structure 131 of the target pipe 103 such that the first inferior congruent end 214 of the first prism structure 111 of the master tube 101 inserts into the third superior congruent end 233 of the third prism structure 131 of the target pipe 103.

The first prism structure 111 is a tubular structure that forms the primary shape of the master tube 101. The first prism structure 111 is a hollow structure. The capture structure 102 installs in the interior space of the first prism structure 111.

The handle 112 is a mechanical structure. The handle 112 attaches to the exterior surface of the first lateral face 215 of the first prism structure 111. The handle 112 forms a gripping apparatus that allows for the manual manipulation and carrying of the master tube 101. The handle 112 comprises a first grip 141, a second grip 143, a first pivot 142, and a second pivot 144.

The first grip 141 is a shaft that attaches to the exterior surface of the first lateral face 215 of the first prism structure 111 of the target pipe 103. The first grip 141 is a rotating structure. The first grip 141 is sized such that the first grip 141 can be grasped by a hand. The first pivot 142 attaches the first grip 141 to the exterior surface of the first prism structure 111 such that the first grip 141 rotates relative to the first prism structure 111. The first grip 141 rotates such that the center axis of the first grip 141 rotates from a position parallel to the center axis of the first prism structure 111 to a position perpendicular to the center axis of the first prism structure 111.

The second grip 143 is a shaft that attaches to the exterior surface of the first lateral face 215 of the first prism structure 111 of the target pipe 103. The second grip 143 is a rotating structure. The second grip 143 is sized such that the second grip 143 can be grasped by a hand. The second pivot 144 attaches the second grip 143 to the exterior surface of the first prism structure 111 such that the second grip 143 rotates relative to the first prism structure 111. The second grip 143 rotates such that the center axis of the second grip 143 rotates from a position parallel to the center axis of the first prism structure 111 to a position perpendicular to the center axis of the first prism structure 111.

Each of the plurality of pad apertures 113 is an aperture that is formed through the first lateral face 215 of the first prism structure 111. Each of the plurality of pad apertures 113 is sized to receive a disk that is controlled by the capture structure 102. The capture structure 102 inserts the disks through each of the plurality of pad apertures 113 in order to apply pressure against the interior surface of the third lateral face 235 of the third prism structure 131 of the target pipe 103 through the first prism structure 111 of the master tube 101. The plurality of pad apertures 113 comprises a first pad aperture 151 and a second pad aperture 152.

The first pad aperture 151 is an aperture that is formed through the first lateral face 215 of the first prism structure 111. The first pad aperture 151 is sized such that a disk selected from the plurality of pads 171 of the gripping structure 122 will insert through the first pad aperture 151. The second pad aperture 152 is an aperture that is formed through the first lateral face 215 of the first prism structure 111. The second pad aperture 152 is sized such that a disk selected from the plurality of pads 171 of the gripping structure 122 will insert through the second pad aperture 152. The position of the second pad aperture 152 is diametrically opposed to the position of the first pad aperture 151.

The capture structure 102 is a mechanical device. The capture structure 102 is contained within the hollow interior of the master tube 101 such that the capture structure 102 inserts into the target pipe 103 when the master tube 101 inserts into the target pipe 103. The capture structure 102 applies pressure to the interior surface of the target pipe 103 such that frictional forces allow the invention 100 to move the target pipe 103. The capture structure 102 comprises a worm drive 121, a gripping structure 122, and a truncated pyramid structure 123.

The worm drive 121 is a mechanical structure. The worm drive 121 attaches the truncated pyramid structure 123 to the interior surface of the first lateral face 215 of the first prism structure 111 of the master tube 101. The worm drive 121 moves the truncated pyramid structure 123 within the hollow interior of the first prism structure 111 in a direction that is parallel to the center axis of the first prism structure 111. The worm drive 121 comprises a bolt 161, a second prism structure 162, and a bolt 161 grip 163. The second prism structure 162 is further defined with a second inner dimension 221, a second outer dimension 222, a second superior congruent end 223, a second inferior congruent end 224, and a second lateral face 225.

The bolt 161 is a cylindrical structure that is formed with an exterior screw thread. The bolt 161 installs in the interior space of the first prism structure 111 such that the center axis of the bolt 161 aligns with the center axis of the first prism structure 111.

The second prism structure 162 is a nut. The second prism structure 162 is geometrically similar to the first prism structure 111. The second prism structure 162 installs in a fixed position in the hollow interior of the first prism structure 111. Specifically, the second lateral face 225 of the second prism structure 162 permanently attaches in a fixed manner to the first lateral face 215 of the first prism structure 111 such that the second prism structure 162 does not move relative to the first prism structure 111. The interior screw thread of the second prism structure 162 is formed such that the center axis of the interior screw thread aligns with the center axis of the second prism structure 162. The second prism structure 162 installs in the interior space of the first prism structure 111 such that the center axis of the second prism structure 162 aligns with the center axis of the first prism structure 111.

The bolt 161 grip 163 is a prism-shaped grip that attaches to an end of the bolt 161. The bolt 161 grip 163 attaches to the end of the bolt 161 that is proximal to the first superior congruent end 213 of the first prism structure 111. The bolt 161 grip 163 allows for the bolt 161 to be manually rotated during the use of the invention 100. The bolt 161 grip 163 attaches to the bolt 161 such that the center axis of the bolt 161 grip 163 aligns with the center axis of the bolt 161 to form a composite prism structure. The bolt 161 is screwed into and through the second prism structure 162. The fixed position of the second prism structure 162 within the first prism structure 111 requires that the position of the congruent ends of the bolt 161 move relative to the first prism structure 111 as the bolt 161 is rotated within the second prism structure 162.

The gripping structure 122 is a spring-loaded structure. The gripping structure 122 is a mechanical structure used to apply pressure to the interior surface of the third lateral face 235 of the target pipe 103. The gripping structure 122 generates the frictional forces that allow the capture structure 102 of the invention 100 to capture the target pipe 103. The gripping structure 122 comprises a plurality of pads 171 and a tension spring 172.

Each of the plurality of pads 171 is a mechanical structure. Each of the plurality of pads 171 installs within the first prism structure 111 such that a portion any pad selected from the plurality of pads 171 aligns with a pad aperture selected from the plurality of pad apertures 113 of the first prism structure 111. A portion of each pad selected from the plurality of pads 171 passes through a pad aperture selected from the plurality of pad apertures 113. The plurality of pads 171 provides the frictional forces against the interior surface of the third prism structure 131 of the target pipe 103 used to capture the target pipe 103. The plurality of pads 171 comprises a first disk 181, a first plate 183, a second disk 184 and a second plate 186. The first disk 181 further comprises a first abrasive face 182. The second disk 184 further comprises a second abrasive face 185.

The first disk 181 is a disk-shaped structure. The first disk 181 is sized such that the first disk 181 inserts through the first pad aperture 151 of the plurality of pad apertures 113. The first disk 181 moves through the first pad aperture 151 such that the first disk 181 presses against the interior surface of the third lateral face 235 of the target pipe 103. The first disk 181 provides a portion of the frictional forces required by the invention 100 to capture the target pipe 103.

The first plate 183 is a disk-shaped structure that attaches to the face of the first disk 181 that is distal from the first abrasive face 182. The first plate 183 is sized such that the first plate 183 will not pass through the first pad aperture 151. The first plate 183 prevents the first disk 181 from falling out of the first prism structure 111 of the master tube 101.

The first abrasive face 182 is the face of the first disk 181 that is proximal to the interior surface of the third lateral face 235 of the target pipe 103. The first abrasive face 182 is coated in a granulated non-skid material that creates the friction required to capture the target pipe 103.

The second disk 184 is a disk-shaped structure. The second disk 184 is sized such that the second disk 184 inserts through the second pad aperture 152 of the plurality of pad apertures 113. The second disk 184 moves through the second pad aperture 152 such that the second disk 184 presses against the interior surface of the third lateral face 235 of the target pipe 103. The second disk 184 provides a portion of the frictional forces required by the invention 100 to capture the target pipe 103.

The second plate 186 is a disk-shaped structure that attaches to the face of the second disk 184 that is distal from the second abrasive face 185. The second plate 186 is sized such that the second plate 186 will not pass through the second pad aperture 152. The second plate 186 prevents the second disk 184 from falling out of the first prism structure 111 of the master tube 101.

The second abrasive face 185 is the face of the second disk 184 that is proximal to the interior surface of the third lateral face 235 of the target pipe 103. The second abrasive face 185 is coated in a granulated non-skid material that creates the friction required to capture the target pipe 103.

The tension spring 172 is a spring that interconnects the plurality of pads 171. The tension spring 172 is configured to pull the plurality of pads 171 into the interior of the first prism structure 111 when the invention 100 is not in use.

The truncated pyramid structure 123 is a pyramid-shaped structure. The truncated pyramid structure 123 is a truncated structure. The truncated pyramid structure 123 is sized to fit within the hollow interior of the first prism structure 111. The worm drive 121 moves the truncated pyramid structure 123 within the hollow interior of the first prism structure 111 along the direction of the center axis of the first prism structure 111. The truncated pyramid structure 123 provides the motive forces used by the gripping structure 122 to provide frictional pressure against the interior surface of the third lateral face 235 of the third prism structure 131 that forms the target pipe 103. The truncated pyramid structure 123 comprises a base end 191, a truncated apex 192, and a fourth lateral face 193.

The base end 191 of the truncated pyramid structure 123 attaches to the congruent end of the bolt 161 that is distal from the bolt 161 grip 163 to form a composite prism structure. The truncated pyramid structure 123 attaches to the bolt 161 such that the center axis of the bolt 161 aligns with the center axis of the truncated pyramid structure 123. The motion of the bolt 161 within the first prism structure 111 thereby moves the truncated pyramid structure 123 within the first prism structure 111.

The base end 191 is the base of the truncated pyramid shape of the truncated pyramid structure 123. The base end 191 attaches to the end of the bolt 161 that is distal from the bolt 161 grip 163. The base end 191 attaches to the bolt 161 to form a composite prism structure. The base end 191 attaches to the bolt 161 such that the center axes of the bolt 161 and the truncated pyramid structure 123 align.

The truncated apex 192 is the surface of the truncated pyramid structure 123 that is distal from the base end 191. The truncated apex 192 is sized such that the truncated apex 192 will fit between the first plate 183 and the second plate 186 of the plurality of pads 171. The fourth lateral face 193 is the lateral face of the truncated pyramid shape of the truncated pyramid structure 123.

As the truncated apex 192 inserts between the first plate 183 and the second plate 186, the fourth lateral face 193 of the truncated pyramid structure 123 presses against the first plate 183 and the second plate 186 as the truncated pyramid structure 123 moves within the first prism structure 111. The variable diameter of the fourth lateral face 193 causes the span of the distance between the first abrasive face 182 and the second abrasive face 185 to vary as a function of the position of the truncated pyramid structure 123 within the first prism structure 111. The position of the fourth lateral face 193 of the truncated pyramid structure 123 of the first prism structure 111 will therefore control the pressure applied by the first abrasive face 182 and the second abrasive face 185 by the capture structure 102 against the interior surface of the third prism structure 131 of the target pipe 103.

The tension spring 172 returns the first disk 181 and the second disk 184 to their relaxed positions when the truncated pyramid structure 123 is not positioned between the first plate 183 and the second plate 186.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bolt: As used in this disclosure, a bolt is a cylindrical shaft that is formed with an exterior screw thread. A bolt is defined with an outer diameter.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Form Factor: As used in this disclosure, the term form factor refers to the size and shape of an object.

Friction: As used in this disclosure, friction refers to a force that occurs between two objects that are in motion while in contact with each other. The force resists the relative motion of the two objects. More technical, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Inferior: As used in this disclosure, the term inferior refers to an edge or surface of an object that would commonly be referred to as the bottom of the object.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

N-gon: As used in this disclosure, an N-gon is a regular polygon with N sides wherein N is a positive integer number greater than 2.

Non-Skid Material: As used in this disclosure, a non-skid material is a material or structure that can be applied to an object such that the object is inhibited from sliding along the surface upon which the object is resting. Non-skid materials are often, but not always, adhesive, elastic, or abrasive materials.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Pivot: As used in this disclosure, a pivot is a rod or shaft around which an object rotates or swings.

Pressure: As used in this disclosure, pressure refers to a measure of force per unit area.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Radial: As used in this disclosure, the term radial refers to a direction that: 1) is perpendicular to an identified central axis; or, 2) projects away from a center point.

Screw: As used in this disclosure, to screw is a verb meaning: 1) to fasten or unfasten (unscrew) a threaded connection; or 2) to attach a helical structure to a solid structure.

Shaft: As used in this disclosure, a shaft is a long, narrow and rigid prism structure that is used as: 1) a structural element of a larger object; or 2) as a grip or lever for a handle. Shafts often have a cylindrical shape.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to an edge or surface of an object that would commonly be referred to as the top of the object.

Tension Spring: As used in this disclosure, a tension spring, is an elastomeric structure that resists forces attempting to increase the span of the length of the elastomeric structure. The tension spring will return to its original position when the pulling force is removed.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Worm Drive: As used in this disclosure, a worm drive refers to a mechanical arrangement where a rotating cylinder further comprising an exterior screw thread is used to: 1) rotate a gear; or 2) move a plate formed with an interior screw thread in a linear fashion in the direction of the center axis of the rotating cylinder. Worm drives are also referred to as worm gears.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A load engaging device comprising:
a master tube and a capture structure;
wherein the master tube contains the capture structure;
wherein the master tube inserts into a target pipe;
wherein the load engaging device is a mechanical device;
wherein the load engaging device is configured for use with a target pipe;
wherein the load engaging device captures the target pipe;
wherein the load engaging device engages the target pipe from an interior surface of the target pipe;
wherein the target pipe is a prism-shaped tube;
wherein the target pipe comprises a third prism structure;
wherein the third prism structure is a hollow tubular structure;
wherein the third prism structure forms the primary shape of the target pipe;
wherein the third prism structure is further defined with a third inner dimension, a third outer dimension, a third superior congruent end, a third inferior congruent end, and a third lateral face;
wherein the third prism structure of the third superior congruent end of the target pipe is open such that a first prism structure of the master tube will insert into the third prism structure;
wherein the capture structure comprises a worm drive, a gripping structure, and a truncated pyramid structure;
wherein the worm drive is a mechanical structure;
wherein the worm drive attaches the truncated pyramid structure to the interior surface of a first lateral face of the first prism structure of the master tube;
wherein the worm drive moves the truncated pyramid structure within a hollow interior of the first prism structure in a direction that is parallel to the center axis of the first prism structure;
wherein the worm drive moves the truncated pyramid structure within the hollow interior of the first prism structure along the direction of the center axis of the first prism structure;
wherein the truncated pyramid structure provides the motive forces used by the gripping structure to provide frictional pressure against the interior surface of the third lateral face of the third prism structure that forms the target pipe;
wherein the worm drive comprises a bolt, a second prism structure, and a bolt grip;
wherein the bolt grip and the second prism structure attach to the bolt;
wherein the second prism structure is further defined with a second inner dimension, a second outer dimension, a second superior congruent end, a second inferior congruent end, and a second lateral face;
wherein the second prism structure is a nut;
wherein the second prism structure is geometrically similar to the first prism structure;
wherein the second lateral face of the second prism structure permanently attaches in a fixed manner to the first lateral face of the first prism structure such that the second prism structure does not move relative to the first prism structure;
wherein an interior screw thread of the second prism structure is formed such that the center axis of the interior screw thread aligns with the center axis of the second prism structure;
wherein the second prism structure installs in the interior space of the first prism structure such that the center axis of the second prism structure aligns with the center axis of the first prism structure.

2. The load engaging device according to claim 1
wherein the capture structure is a spring-loaded device;
wherein the capture structure applies pressure to the interior surface of the target pipe such that the friction between the capture structure and the interior surface of the target pipe allows the load engaging device to capture the target pipe.

3. The load engaging device according to claim 2
wherein the master tube is a prism-shaped tube;
wherein the master tube is geometrically similar to the target pipe;
wherein congruent ends of the prism shape of the master tube are open.

4. The load engaging device according to claim 3
wherein the master tube comprises a first prism structure, a handle, and a plurality of pad apertures;
wherein the handle and the plurality of pad apertures are formed in the first prism structure;
wherein the first prism structure is further defined with a first inner dimension, a first outer dimension, a first superior congruent end, a first inferior congruent end, and the first lateral face.

5. The load engaging device according to claim 4 wherein the first outer dimension of the first prism structure of the master tube is lesser than the span of the length of the third inner dimension of the third prism structure of the target pipe such that the first inferior congruent end of the first prism structure of the master tube inserts into the third superior congruent end of the third prism structure of the target pipe.

6. The load engaging device according to claim 5
wherein the first prism structure is a tubular structure that forms the primary shape of the master tube;

wherein the first prism structure is a hollow structure;
wherein the capture structure installs in the interior space of the first prism structure.

7. The load engaging device according to claim 6
wherein the handle is a mechanical structure;
wherein the handle attaches to the exterior surface of the first lateral face of the first prism structure.

8. The load engaging device according to claim 7
wherein the plurality of pad apertures comprises a first pad aperture and a second pad aperture;
wherein the first pad aperture is an aperture that is formed through the first lateral face of the first prism structure;
wherein the second pad aperture is an aperture that is formed through the first lateral face of the first prism structure;
wherein the position of the second pad aperture is diametrically opposed to the position of the first pad aperture.

9. The load engaging device according to claim 8
wherein the capture structure is a mechanical device;
wherein the capture structure is contained within the hollow interior of the master tube such that the capture structure inserts into the target pipe when the master tube inserts into the target pipe.

10. The load engaging device according to claim 9
wherein the gripping structure is a spring-loaded structure;
wherein the gripping structure is a mechanical structure used to apply pressure to the interior surface of the third lateral face of the target pipe;
wherein the gripping structure generates the frictional forces that allow the capture structure of the load engaging device to capture the target pipe.

11. The load engaging device according to claim 10
wherein the truncated pyramid structure is a pyramid-shaped structure;
wherein the truncated pyramid structure is a truncated structure;
wherein the truncated pyramid structure is sized to fit within the hollow interior of the first prism structure.

12. The load engaging device according to claim 11
wherein the bolt is a cylindrical structure that is formed with an exterior screw thread;
wherein the bolt is screwed into and through the second prism structure;
wherein the bolt installs in the interior space of the first prism structure such that the center axis of the bolt aligns with the center axis of the first prism structure.

13. The load engaging device according to claim 12
wherein the bolt grip is a prism-shaped grip that attaches to an end of the bolt;
wherein the bolt grip attaches to the end of the bolt that is proximal to the first superior congruent end of the first prism structure;
wherein the bolt grip attaches to the bolt such that the center axis of the bolt grip aligns with the center axis of the bolt to form a composite prism structure.

14. The load engaging device according to claim 13
wherein the gripping structure comprises a plurality of pads and a tension spring;
wherein each of the plurality of pads is a mechanical structure;
wherein each of the plurality of pads installs within the first prism structure such that a portion any pad selected from the plurality of pads aligns with a pad aperture selected from the plurality of pad apertures of the first prism structure;
wherein a portion of each pad selected from the plurality of pads passes through a pad aperture selected from the plurality of pad apertures;
wherein the plurality of pads provides the frictional forces against the interior surface of the third prism structure of the target pipe used to capture the target pipe;
wherein the tension spring is a spring that interconnects the plurality of pads;
wherein the tension spring is configured to pull the plurality of pads into the interior of the first prism structure.

15. The load engaging device according to claim 14
wherein the truncated pyramid structure comprises a base end, a truncated apex, and a fourth lateral face;
wherein the base end of the truncated pyramid structure attaches to the congruent end of the bolt that is distal from the bolt grip to form a composite prism structure;
wherein the truncated pyramid structure attaches to the bolt such that the center axis of the bolt aligns with the center axis of the truncated pyramid structure;
wherein the motion of the bolt within the first prism structure thereby moves the truncated pyramid structure within the first prism structure;
wherein the base end is the base of the truncated pyramid shape of the truncated pyramid structure;
wherein the base end attaches to the end of the bolt that is distal from the bolt grip;
wherein the base end attaches to the bolt to form a composite prism structure;
wherein the base end attaches to the bolt such that the center axes of the bolt and the truncated pyramid structure align;
wherein the truncated apex is the surface of the truncated pyramid structure that is distal from the base end;
wherein the truncated apex is sized such that the truncated apex will fit between a first plate and a second plate of the plurality of pads;
wherein the fourth lateral face is the lateral face of the truncated pyramid shape of the truncated pyramid structure;
wherein as the truncated apex inserts between the first plate and the second plate, the fourth lateral face of the truncated pyramid structure presses against the first plate and the second plate as the truncated pyramid structure moves within the first prism structure;
wherein the variable diameter of the fourth lateral face causes the span of the distance between a first abrasive face and a second abrasive face to vary as a function of the position of the truncated pyramid structure within the first prism structure;
wherein the position of the fourth lateral face of the truncated pyramid structure of the first prism structure will therefore control the pressure applied by the first abrasive face and the second abrasive face by the capture structure against the interior surface of the third prism structure of the target pipe.

16. The load engaging device according to claim 15
wherein the handle comprises a first grip, a second grip, a first pivot, and a second pivot;
wherein the first grip is a shaft that attaches to the exterior surface of the first lateral face of the first prism structure of the target pipe;
wherein the first grip is sized such that the first grip can be grasped by a hand;
wherein the first pivot attaches the first grip to the exterior surface of the first prism structure such that the first grip rotates relative to the first prism structure;

wherein the first grip rotates such that the center axis of the first grip rotates from a position parallel to the center axis of the first prism structure to a position perpendicular to the center axis of the first prism structure;

wherein the second grip is a shaft that attaches to the exterior surface of the first lateral face of the first prism structure of the target pipe;

wherein the second grip is a rotating structure;

wherein the second grip is sized such that the second grip can be grasped by a hand;

wherein the second pivot attaches the second grip to the exterior surface of the first prism structure such that the second grip rotates relative to the first prism structure;

wherein the second grip rotates such that the center axis of the second grip rotates from a position parallel to the center axis of the first prism structure to a position perpendicular to the center axis of the first prism structure;

wherein the plurality of pads comprises a first disk, a first plate, a second disk and a second plate;

wherein the first disk further comprises a first abrasive face;

wherein the second disk further comprises a second abrasive face;

wherein the first disk is a disk-shaped structure;

wherein the first disk is sized such that the first disk inserts through the first pad aperture of the plurality of pad apertures;

wherein the first disk moves through the first pad aperture such that the first disk presses against the interior surface of the third lateral face of the target pipe;

wherein the first disk provides a portion of the frictional forces required by the load engaging device to capture the target pipe;

wherein the first plate is a disk-shaped structure that attaches to the face of the first disk that is distal from the first abrasive face;

wherein the first plate is sized such that the first plate will not pass through the first pad aperture;

wherein the first plate prevents the first disk from falling out of the first prism structure of the master tube;

wherein the first abrasive face is the face of the first disk that is proximal to the interior surface of the third lateral face of the target pipe;

wherein the first abrasive face is coated in a granulated non-skid material that creates the friction required to capture the target pipe;

wherein the second disk is a disk-shaped structure;

wherein the second disk is sized such that the second disk inserts through the second pad aperture of the plurality of pad apertures;

wherein the second disk moves through the second pad aperture such that the second disk presses against the interior surface of the third lateral face of the target pipe;

wherein the second disk provides a portion of the frictional forces required by the load engaging device to capture the target pipe;

wherein the second plate is a disk-shaped structure that attaches to the face of the second disk that is distal from the second abrasive face;

wherein the second plate is sized such that the second plate will not pass through the second pad aperture;

wherein the second plate prevents the second disk from falling out of the first prism structure of the master tube;

wherein the second abrasive face is the face of the second disk that is proximal to the interior surface of the third lateral face of the target pipe;

wherein the second abrasive face is coated in a granulated non-skid material that creates the friction required to capture the target pipe.

* * * * *